United States Patent [19]

Jinnouchi

[11] 4,287,814
[45] Sep. 8, 1981

[54] BELLOWS APPARATUS

[75] Inventor: Takeshi Jinnouchi, Sakado, Japan

[73] Assignee: Nippon Oil Seal Industry, Co., Ltd., Tokyo, Japan

[21] Appl. No.: 59,108

[22] Filed: Jul. 19, 1979

Related U.S. Application Data

[62] Division of Ser. No. 834,445, Sep. 19, 1977.

[30] Foreign Application Priority Data

Sep. 22, 1976 [JP] Japan .................. 51-128026

[51] Int. Cl.³ .............................. F16J 3/04
[52] U.S. Cl. ............................ 92/43; 92/39
[58] Field of Search ............ 92/34, 37, 39, 43, 44

[56] References Cited
U.S. PATENT DOCUMENTS

1,169,250  1/1916  Fulton ........................ 92/43 X
3,731,595  5/1973  Wentworth, Jr. ............ 92/43 X
3,935,795  2/1976  Hawley ....................... 92/43 X Primary Examiner—Irwin C. Cohen
Attorney, Agent, or Firm—Holman & Stern

[57] ABSTRACT

A bellows apparatus consisting essentially of a bellows main body and restriction means for restricting elongation and contraction, said restriction means comprising plural annular guide metals provided integrally to said bellows main body with a predetermined spacing therebetween in the axial direction, plural guide members secured integrally to each of said guide metals and extending in the axial direction, and plural stoppers extending integrally in the circumferential direction from the edge section in the axial direction of said guide members. Said guide members displaced with respect to each other in the circumferential direction, and their respective stoppers engage with adjacent stoppers and the annular guide metals to thus restrict elongation and contraction respectively of said bellows main body.

1 Claim, 15 Drawing Figures

BELLOWS APPARATUS

This is a divisional application Ser. No. 834,445 filed Sept. 19, 1977.

BRIEF SUMMARY

The present invention relates to a bellows apparatus. More specifically, the present invention relates to a bellows apparatus capable of effectively restricting elongation and contraction of the bellows main body.

Figure 1:
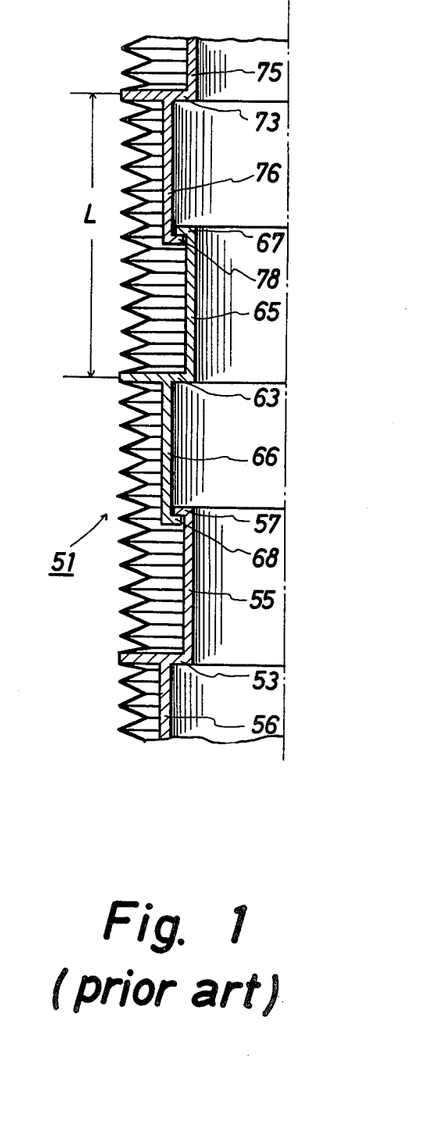
FIG. 1 is a longitudinal sectional view showing the conventional bellows apparatus as it is in an elongated state.
Figure 2:
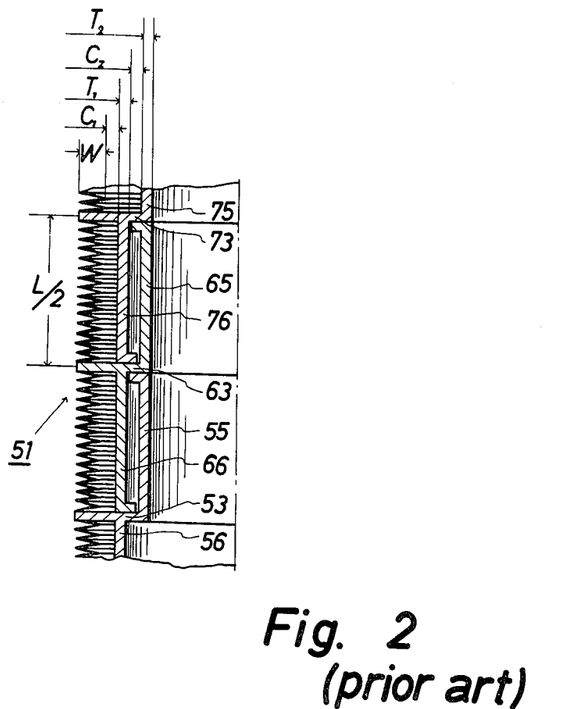
FIG. 2 is a longitudinal sectional view showing the apparatus of FIG. 1 as it is in a contracted state.
Figure 3:
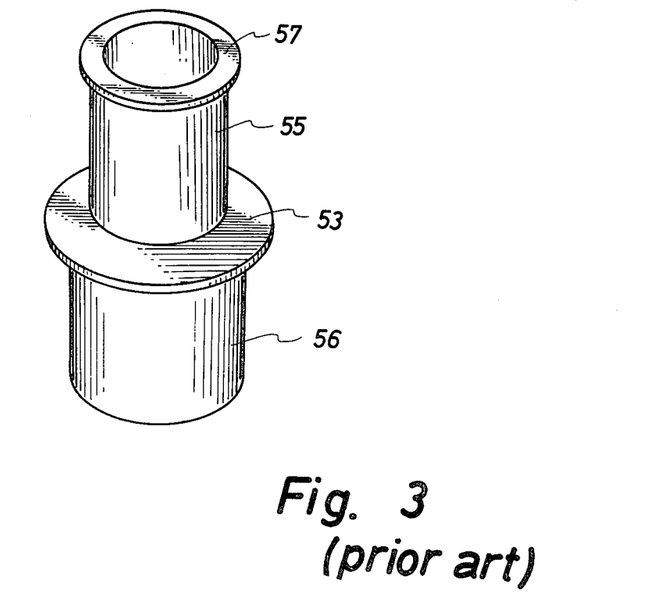
FIG. 3 is a perspective view showing one unit of the guide metal and the guide member used in the apparatus shown in FIG. 1.

As a bellows apparatus having the construction to restrict elongation and contraction of the bellows main body, there have heretofore been known the apparatuses of the type as illustrated in FIGS. 1 through 3.

Namely, plural first, second and third guide metals 53, 63, 73 are integrally provided to the bellows main body 51 with a predetermined spacing therebetween in the axial direction. These first, second and third guide metals 53, 63, 73 have a flat annular shape and their outer circumferential section is integrally secured to the bellows main body 51. Cylindrical first, second and third guide members 55, 65, 75 are integrally shaped at the inner circumferential edge section in the direction of diameter of the first, second and third guide metals 53, 63, 73 and extend in one of axial directions (upwardly in the drawing). Cylindrical first, second and third guide members 56, 66, 76 are integrally shaped with the guide metals 53, 63, 73 and extend in the other of axial directions (downwardly in the drawing). These first, second and third guide members 56, 66, 76 have a diameter which is greater than the diameter of the abovementioned first, second and third guide members 55, 65, 75. On the other hand, first and second locking plates 57, 67 are shaped at the edge section in the axial direction of the first and second guide members 55, 65 and extend outwardly in the direction of diameter. Furthermore, second and third locking protuberances 68, 78 are shaped at the edge section in the axial direction of the second and third guide members 66, 76 and extend inwardly in the direction of diameter.

The bellows apparatus of the prior art having the abovementioned construction has drawbacks to be described.

(1) When the gap is L between the second guide metal 63 and the third guide metal 73 at maximum elongation of the bellows main body 51 as shown in FIG. 1, the gap is approximately L/2 between the second and third guide metals 63 and 73 at maximum contraction of the bellows main body as shown in FIG. 2. In other words, the upper limit of the rate of elongation of the conventional bellows apparatus has been two times. For this reason, it has been impossible to effectively utilize the elongation and contraction of the bellows main body 51.

(2) In addition, the first, second and third guide members 55, 65, 75 are arranged such that they are superposed upon the first, second and third guide members 56, 66, 76, respectively, in the direction of diameter. Hence, the thickness X in the direction of diameter of the bellows apparatus becomes $W+C_1+T_1+C_2+T_2$ where W is the thickness in the direction of diameter of the bellows main body 51; $C_1$ is the gap between the inner circumferential surface of the bellows main body 51 and the outer circumferential surface of the first, second and third guide members 56, 66, 76; $T_1$ is the thickness in the direction of diameter of the first, second and third guide members 56, 66, 76; $C_2$ is the gap between the inner circumferential surface of the first, second and third guide members 56, 66, 76 and the outer circumferential surface of the first, second and third guide members 55, 65, 75; and $T_2$ is the thickness in the direction of diameter of the first, second and third guide members 55, 65, 75. Since the thickness X becomes thicker, the bellows main body 51 has only a limited space therein that can be effectively utilized.

It is an object of the present invention to provide a bellows apparatus capable of optionally controlling elongation and contraction of the bellows main body by way of solving the above-described problems inherent to the conventional apparatus.

It is another object of the invention to provide a bellows apparatus which reduces the thickness in the direction of diameter of the apparatus as a whole by disposing plural guide members in the circumferential direction.

In order to accomplish the abovementioned objects, the bellows apparatus of the present invention consists essentially of the bellows main body and restriction means for restricting elongation and contraction comprising plural guide metals, plural guide guide members and plural stoppers. Namely, plural guide metals having a flat annular shape are integrally secured to the bellows main body with a predetermined spacing therebetween in the axial direction, and plural guide members are provided to the inner circumferential section of the guide metals so as to extend in the axial direction. The stoppers are shaped at both edge sections in the axial direction of these guide members and oppose to each other in the circumferential direction.

Elongation of the bellows main body is restricted by engagement of the stoppers provided to the guide members that are adjacent to each other in the circumferential direction and contraction of the same is restricted by butting of both edge sections in the axial direction of the guide member to the side surface of the guide metal spaced by one guide metal from the guide metal to which said guide member is fitted.

In addition to the stoppers of the abovementioned apparatus, another embodiment of the present apparatus includes reversely-directing stoppers formed at both edge sections in the axial direction of the guide members so as to oppose said stoppers in the curcumferential direction. In this embodiment, elongation and contraction of the bellows main body are restricted by mutual engagement of the reversely-directing stoppers formed at both edge sections in the axial direction of two guide members adjacent to each other.

Still another embodiment of the apparatus of the present invention includes first guide members that are formed on two guide metals interposing one guide metal therebetween, deviated from each other in the circumferential direction and extend in the axial direction opposite to each other. Second guide members are formed on the guide metal interposed by the abovementioned guide metals and interpose each of said first guide members, and stoppers are provided to edge sections in the axial direction of these first and second guide members. In this embodiment, contraction of the bellows main body is restricted by the engagement between the stoppers provided to the first guide members and the stoppers provided to the second guide members, and elongation of the same is restricted when the edge sections in the axial direction of the first guide members butt both side surfaces of the guide metal to which the first guide members are fitted.

Accordingly, the apparatus in accordance with the present invention enables to reduce the thickness in the direction of diameter of the apparatus and ensures adequate elongation of the bellows main body.

DESCRIPTION OF THE PREFERRED EMBODIMENTS

Figure 4:
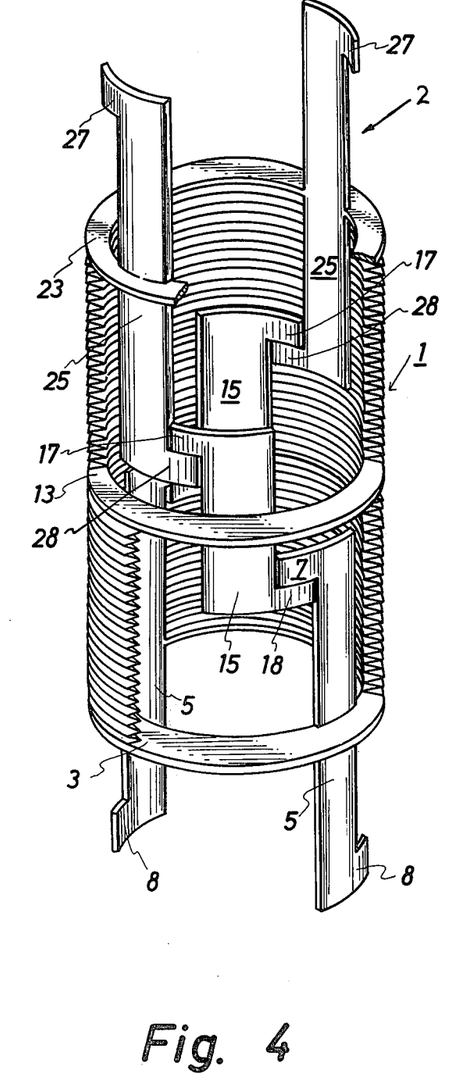
FIG. 4 is a partially cut-away perspective view showing the apparatus in accordance with the present invention as it is in an elongated state.
Figure 5:
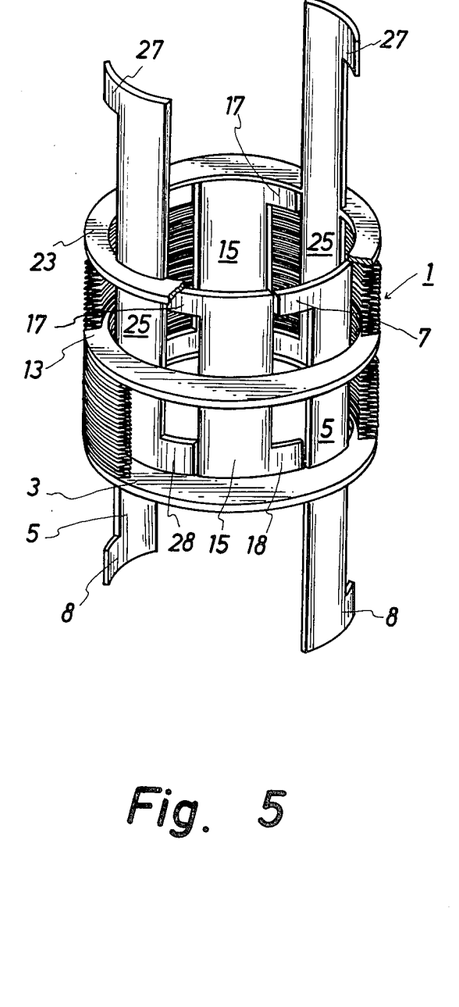
FIG. 5 is a perspective view showing the apparatus shown in FIG. 4 as it is in a contracted state.

With reference to FIGS. 4 through 8 initially, an embodiment of the present invention will now be illustrated. The bellows apparatus in accordance with the present invention is composed of a bellows main body 1 and restriction means 2 for restricting the elongation and contraction comprising plural guide metals 3, 13, 23, plural guide members 5, 15, 25 and plural stoppers 7, 8, 17, 18, 27, 28. Namely, the first, second and third flat annular guide metals 3, 13, 23 are integrally secured to the bellows main body 1 with a predetermined gap therebetween in the axial direction. These first, second and third guide metals 3, 13, 23 are integrally secured to the bellows main body 1 at their outer circumferential section and in turn support integrally at their inner circumferential section the first, second and third guide members 5, 15, 25, respectively, extending in the axial direction. In other words, at the inner circumferential section of the first guide metal 3, there are arranged two first guide members 5, 5 to oppose to each other, and the second and third guide metals 13, 23 also are similarly provided with two each of the guide members to oppose each other, respectively. The first, second and third guide members 5, 15, 25 are arranged such that they do not overlap with each other. At the upper edge section of the first guide member 5 in the axial direction, there is provided a first stopper 7 extending leftwardly in the circumferential direction, and a first oppositely-directed stopper 8 is provided at the lower edge section of the first guide member 5 in the axial direction to extend to the right in the circumferential direction. These stoppers 7, 8 are integrally shaped with the guide members 5. Similarly, a second stopper 17 extending to the left in the circumferential direction is integrally shaped with the second guide member 15 at its upper edge section in the axial direction, and a second oppositely-directed stopper 18 extending to the right in the circumferential direction (towards the first stopper 7) at its lower edge section in the axial direction. Likewise a third stopper 27 extending to the left in the circumferential direction is integrally shaped with the third guide member 25 at its upper edge section in the axial direction and a third oppositely-directed stopper 28 extending to the right in the circumferential direction (towards the second stopper 17) at its lower edge section in the axial direction. In comparison with the second guide metal 13, the first guide metal 3 and the third guide metal 23 protrude more inwardly in the direction of diameter, engage with the second stopper 17 and the second oppositely-directed stopper 18, respectively, when the apparatus is contracted as shown in FIG. 5, and thus prevent further contracting of the bellows main body 1.

Next, the distinction between the embodiment mentioned above and another embodiment of this invention will be principally clarified with reference to FIGS. 9 through 13. Three each of the first, second and third guide members 5, 15, 25 are integrally secured to the first, second and third guide metals 3, 13, 23, respectively, with a gap of 120 degrees in the circumferential direction between them. In the same way as in the above-mentioned embodiment, these first, second and third guide members 5, 15, 25 are integrally equipped with the first, second and third oppositely-directed stoppers 8, 18, 28, respectively. The first, second and third guide members 5, 15, 25 of this embodiment are further provided with first, second and third protuberances 9, 19, 29 protruding in the direction opposite to the first, second and third stoppers 7, 17, 27 (to the right in the drawing) in the proximity of their upper edge section and with first, second and third oppositely-directed protuberances 10, 20, 30 protruding in the direction opposite the first, second and third reversely-directing stoppers 8, 18, 28 (to the left in the drawing) in the proximity of their lower edge section, respectively. Unlike the above-mentioned embodiment, therefore, the first guide metal 3 and the third guide metal 13 in this embodiment are not allowed to protrude in the direction of diameter.

The distinction of still another embodiment of the present invention between the aforementioned two embodiments will now be explained principally with reference to FIGS. 14 and 15. In this embodiment, two first guide members 5 are integrally adapted to the first guide metal 3 so that they are mutually deviated in the circumferential direction and oppositely extend in the axial direction. The first stopper 7 and the first oppositely-directed stopper 8 are integrally formed at the edge in the axial direction of each of these first guide members 5. The third guide member 25, the third stopper 27 and the third oppositely-directed stopper 28 are provided or the third guide metal 23 symmetrically to the first guide metal 3. On the other hand, two pairs (4 in total) of the second guide members 15 are adapted on the second guide metal 13 so that the second guide members 15 of each pair are opposed to those of the other pair in the axial direction and interpose the first or third guide member 5, 25 therebetween, respectively. The second stopper 17 and the reversely-directing stopper 18 are formed at the edge section of second guide members 15 to oppose each other.

The embodiments having the above-described construction of the present invention provide the following action and effect.

Figure 6:
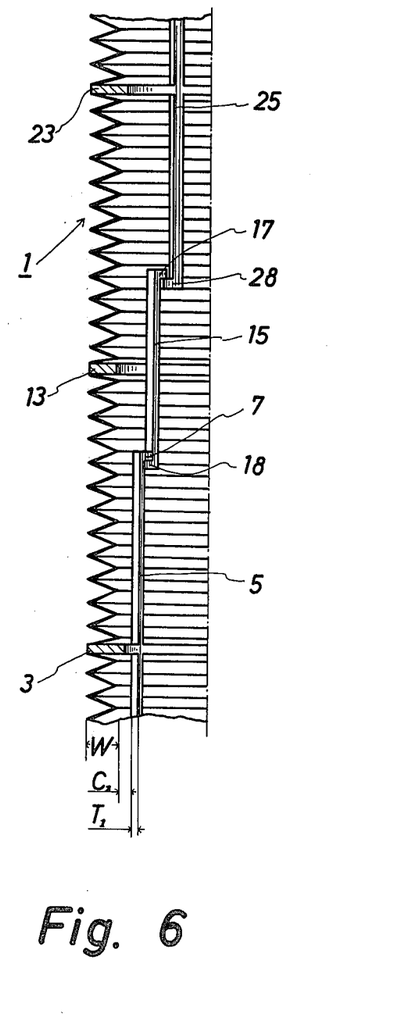
FIGS. 6 through 8 are schematic views showing the apparatus of FIG. 4 in simplification.
Figure 7:
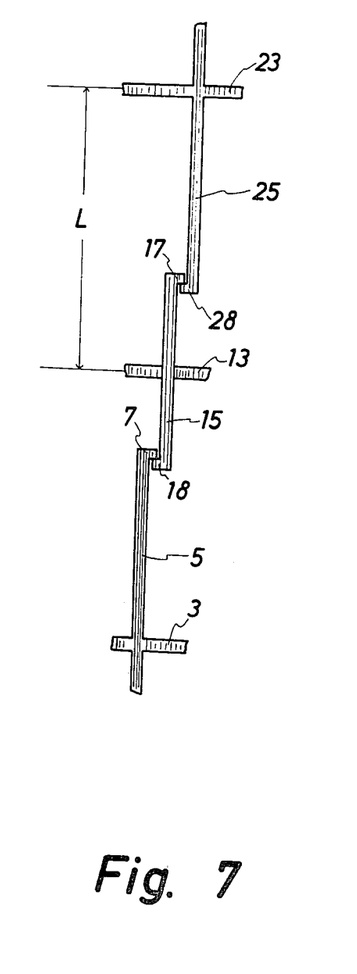
Figure 8:
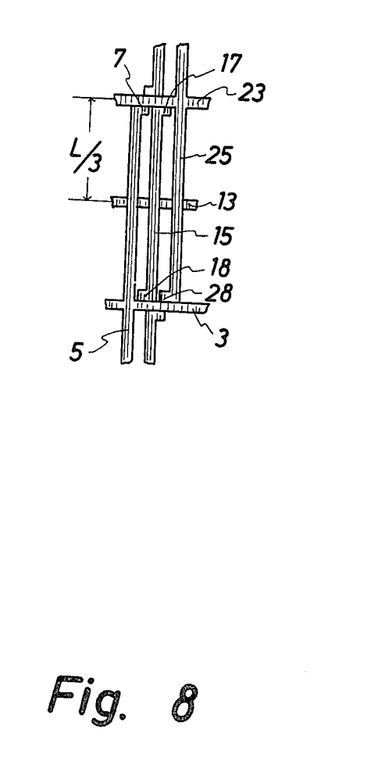
Figure 9:
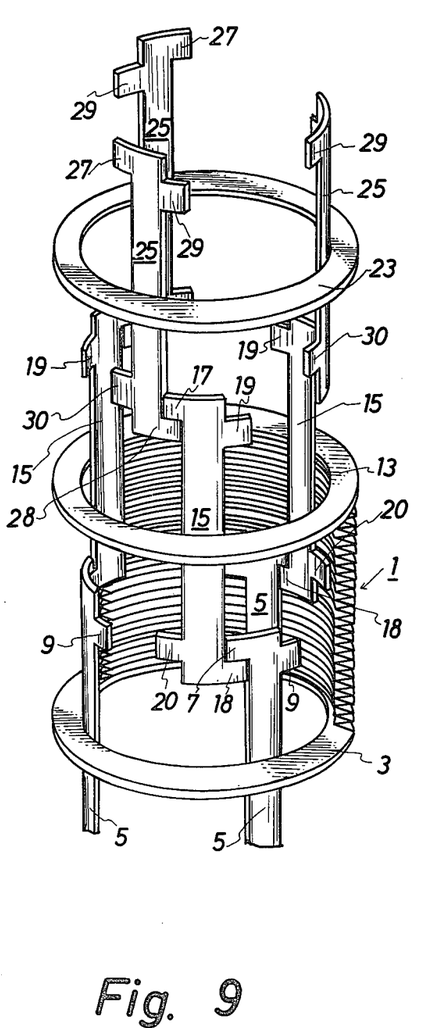
FIGS. 9 through 13 illustrate another embodiment in accordance with the present invention correspondingly to FIGS. 4 through 8, respectively.
Figure 10:
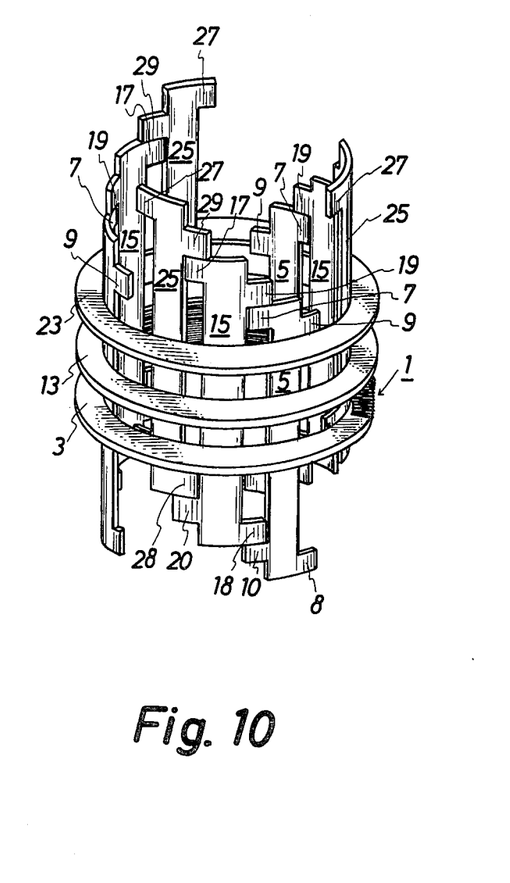
Figure 11:
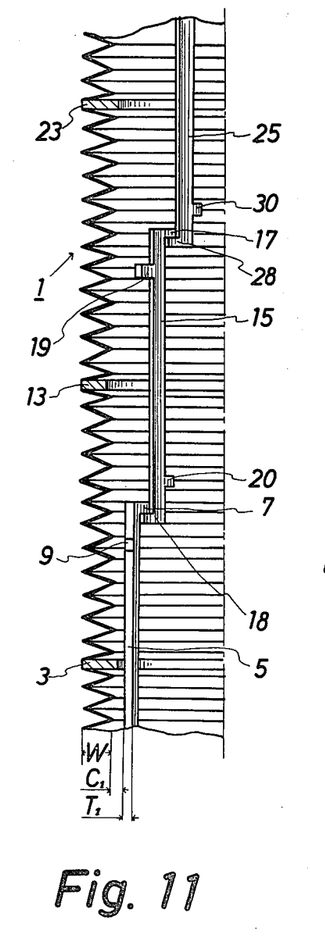
Figure 12:
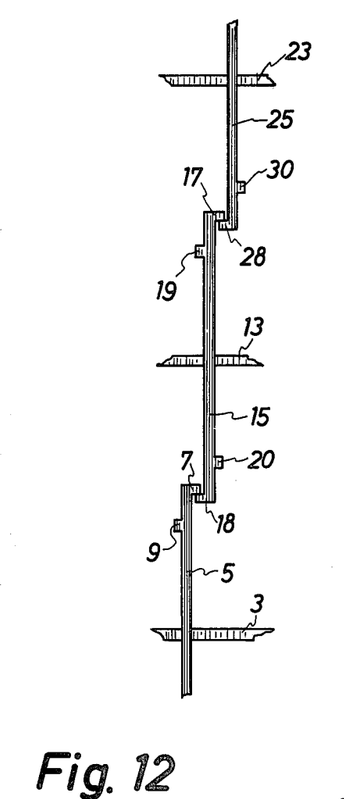
Figure 13:
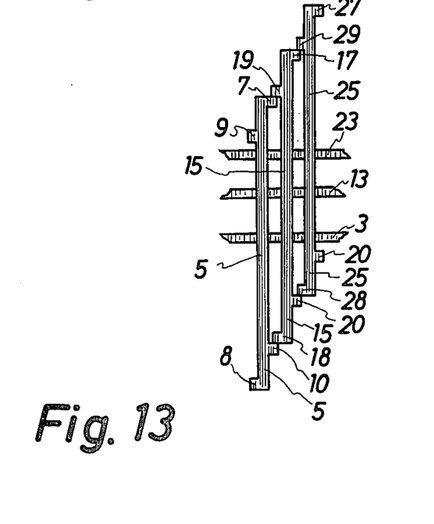

Explanation is first given on the embodiment illustrated in FIGS. 4 through 8. As shown in FIGS. 4, 6 and 7, the first, second and third stoppers 7, 17, 27 engage with the first, second and third reversely-directing stoppers 8, 18, 28, respectively, so thereby keep the bellows main body 1 in a maximum elongated state. It is assumed that the gap is L between the second guide metal 13 and the third guide metal 23 in this maximum elongation of the bellows main body 1. Next, when the second stopper 17 is brought into contact with the third guide metal 23 and the second oppositely-directed stopper 18 with the first guide metal 3, as shown in FIGS. 5 and 8, the bellows main body 1 is fully contracted. The gap between the second guide metal 13 and the third guide metal 23 is approximately L/3 in the maximum contraction of the bellows main body 1. On the other hand, the entire thickness X of the bellows apparatus in the direction of diameter is $W+C_1+T_1$ where W is the thickness of the bellows main body 1 in the direction of diameter, $C_1$ is a gap between the inner circumferential surface of the bellows main body 1 and the outer circumferential surface of the first, second and third guide members 5, 15, 25, and $T_1$ is a thickness in the direction of diameter of the first, second and third guide members 5, 15, 25.

In comparison with the conventional bellows apparatus, therefore, the bellows apparatus in accordance with the present invention makes it possible to reduce the thickness in the direction of diameter and to increase an elongation rate of the bellows main body 1 by three times.

The action and effects of another embodiment of the invention shown in FIGS. 9 through 13 are as follows. In this embodiment, the first, second and third protuberances 9, 19, 29 and the first, second and third oppositely-directed protuberances 10, 20, 30 are provided on the first, second and third guide members 5, 15, 25, respectively, so that engagement between the second oppositely-directed stopper 18 and the first oppositely-directed stopper 10 and between the second reversely-directing protuberance 20 and the third oppositely-directed stopper 28 restricts the limit of contraction of the bellows main body 1. Hence, it is possible to optionally change the rate of contraction of the bellows main body 1 by varying the positions of the first, second and third protuberances 9, 19, 29 relative to those of the first, second and third reversely-directing protuberances 10, 20, 30. In other words, this embodiment allows the bellows main body 1 to contract to the limit of contraction (to such a state at which the bellows main bodies 1 contract mutually) by setting the fitting positions of the first, second and third protuberances 9, 19, 29 and those of the first, second and third oppositely-directed protuberances 10, 20, 30 to the edge sections in the axial direction of the first, second and third guide members 5, 15, 25, respectively. The entire thickness X in the direction of diameter of the bellows apparatus becomes $W+C_1+T_1$ as in the aforementioned embodiment and is thinner in comparison with the conventional bellows apparatus.

Figure 14:
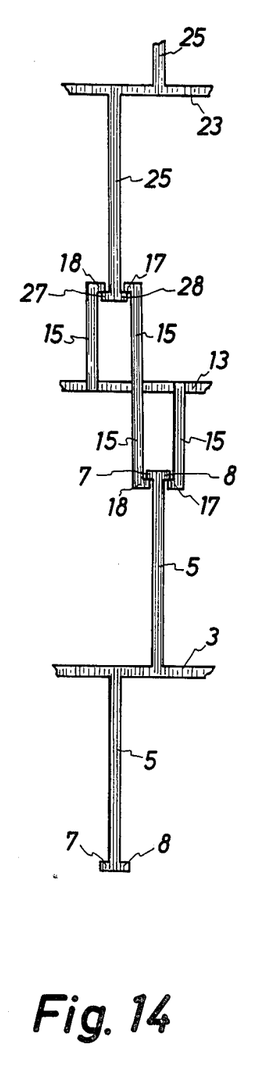
FIGS. 14 and 15 illustrate still another embodiment in accordance with the present invention correspondingly to FIGS. 7 and 8, respectively, in simplification.
Figure 15:
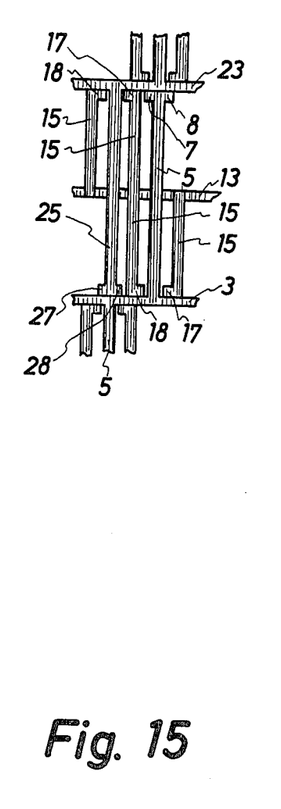

The action and effects of still another embodiment of the present invention shown in FIGS. 14 and 15 are as follows. When the bellows main body is elongated to maximum as shown in FIG. 14, the first stopper 7 and the first oppositely-directed stopper 8 engage with the second stopper 17 and the second oppositely-directed stopper 18, respectively, and prevent further elongation of the bellows main body 1. On the other hand, when the bellows main body 1 is contracted to maximum as shown in FIG. 15, the first stopper 7 and the first oppositely-directed stopper 8 are brought into locking contact with the third guide metal 23 and restrict further contraction of the bellows main body 1. As can be appreciated from the preceeding explanation, it is possible also in this embodiment to increase the rate of elongation of the bellows main body 1 and to reduce the thickness in the direction of diameter of the bellows apparatus when compared with the conventional apparatus. In addition, the guide members also function to restrict the movement in the circumferential direction.

Since the first, second and third guide members 5, 15, 25 are arranged in the circumferential direction in the present invention as described in the foregoing paragraphs, it is possible to reduce the entire thickness in the direction of diameter of the apparatus and to select an optional rate of elongation for the bellows main body 1.

Though the foregoing embodiments use three guide metals, the number of the guide metals may be properly selected in accordance with the length of the bellows main body. In the like manner, the number of the guide members to be fitted to the guide metal may be properly selected.

It is to be understood that the invention may be practiced other than as specifically described hereinabove, the scope of the invention be limited only by the definition provided by the appended claims.

What is claimed is:
1. A bellows apparatus consisting essentially of a bellows main body and restriction means for restricting elongation and contraction, said restriction means comprising
 a plurality of annular first, second and third guide metals arranged integrally with said bellows main body with a predetermined spacing therebetween in the axial direction;
 a plurality of first, second and third guide members each secured integrally to each of said first, second and third guide metals and extending in the axial direction and terminating in edge sections;
 a plurality of first, second and third stoppers, each integrally extending in the circumferential direction from the edge section respectively of said first, second and third guide members;
 said first and third guide metals being positioned to interpose said second guide metal therebetween and provided, respectively, with first and third guide members that are displaced at said first and third guide metals with respect to each other in the circumferential direction and extend oppositely to each other in the axial direction;
 said second guide members comprising a central and two outer guide members displaced circumferentially with respect to each other and with respect to said first and third guide members so that one of each first and third guide members is disposed circumferentially between said central second guide member and one of said outer second guide members, said central second guide member extending axially in both directions from said second guide metal and said outer second guide members extending axially in opposite directions with respect to each other from said second guide metal;
 said stoppers on said first and third guide members comprising two oppositely directed stoppers which overlap circumferentially said second stoppers on said second guide members between which they are disposed;
 said first, second and third guide members being disposed such that they do not overlap each other in the circumferential direction, and restrict the elongation of said bellows main body by engagement of said first, second and third stoppers, and said first guide member being abutted by said third guide metal and said third guide member being abutted by said first guide metal, when said bellows main body is fully contracted.

* * * * *